United States Patent
Rudd et al.

(10) Patent No.: US 6,295,391 B1
(45) Date of Patent: Sep. 25, 2001

(54) AUTOMATIC DATA ROUTING VIA VOICE COMMAND ANNOTATION

(75) Inventors: Michael L Rudd, Fort Collins; Thomas C Oliver, Ft Collins, both of CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/219,972

(22) Filed: Dec. 23, 1998

Related U.S. Application Data

(63) Continuation-in-part of application No. 09/026,082, filed on Feb. 19, 1998.

(51) Int. Cl.$^7$ .................................................. G06K 9/22
(52) U.S. Cl. ........................ 382/313; 382/312; 382/321; 381/110; 704/275
(58) Field of Search .................................... 382/313, 312, 382/321; 707/503; 709/203, 217; 725/86; 704/426, 275; 381/110, 122

(56) References Cited

U.S. PATENT DOCUMENTS

| | | | |
|---|---|---|---|
| 4,462,080 | * 7/1984 | Johnstone et al. | 704/200 |
| 4,556,944 | * 12/1985 | Daniels et al. | 381/110 |
| 4,776,016 | * 10/1988 | Hansen | 704/275 |
| 4,951,147 | * 8/1990 | Aknar et al. | 348/143 |
| 5,430,558 | 7/1995 | Sohaei et al. | 358/473 |
| 5,526,407 | * 6/1996 | Russell et al. | 379/88.01 |
| 5,721,827 | * 2/1998 | Logan et al. | 709/217 |
| 5,732,216 | * 3/1998 | Logan et al. | 709/203 |
| 5,737,395 | * 4/1998 | Irribarren | 379/88.13 |
| 5,737,491 | * 4/1998 | Allen et al. | 704/270 |
| 5,794,251 | * 8/1998 | Watanabe et al. | 707/200 |
| 5,838,718 | * 11/1998 | Ichihashi | 375/133 |
| 6,157,935 | * 12/2000 | Tran et al. | 707/503 |

* cited by examiner

Primary Examiner—Jose L. Couso
Assistant Examiner—Anh Hong Do

(57) ABSTRACT

A system for automatically routing data captured by devices, such as digital cameras, personal digital assistants, laptop computers, or portable document scanners, through voice command annotation is disclosed. After capturing an image or document with the device, a voice disposition command is made by a user speaking into a voice pickup component in the device to control the disposition of the captured image or document. Commands such as "fax", "e-mail", "print and save" are typical. The voice input is stored in the device in a voice command annotation file and is associated with the image or document data file. Upon copying the image or document data file to a host computer system, the voice command annotation file is automatically copied with it. The host computer system processes the voice command annotation file and executes one or more instructions associated with the command or commands contained in the file.

28 Claims, 9 Drawing Sheets

AUTOMATIC DATA ROUTING VIA VOICE COMMAND ANNOTATION

CROSS REFERENCE TO RELATED APPLICATIONS

This application is a continuation-in-part of application Ser. No. 09/026,082 of Thomas C. Oliver filed Feb. 19, 1998 entitled Voice Annotation of Scanned Images for Portable Scanning Application.

TECHNICAL FIELD

This invention relates to devices such as digital cameras, personal digital assistants, laptop computers, hand held document scanners, and any other device that stores data and uploads or copies the data to a personal computer. Even more particularly, the invention relates to voice command annotation of data captured by one of these devices for automatic data routing upon uploading or copying to a personal computer.

BACKGROUND OF THE INVENTION

Many devices, such as digital cameras, personal digital assistants, laptop computers, and hand held document scanners, have the ability to collect many different images or documents from a variety of sources. In many cases the user may want to accomplish different tasks with each image or document captured. Some may be faxed or e-mailed to business associates or friends. Others may become part of a word processing document. Still others may need to be stored in a specific location. Normally, such devices are periodically connected to a personal computer, and the collected image data files or document data files are copied to the personal computer from the device as a group, or copied individually to the personal computer. In either case, the user must look at each specific image data file or document data file after copying and take action to have that image or document processed or sent to the right place: save image A in this format here; save document B in that format there; attach image C to an e-mail message; fax document D to a business associate, etc. This can be a very time consuming process, especially if a large number of image data files and document data files have been captured. In addition, if the images and documents are collected over an extended period of time, such as on a business trip, by the time the individual copies them to the personal computer for processing and routing, the individual may have difficulty remembering exactly what action was intended for each one. The best time, in most cases, for an individual to determine the disposition of a captured image or document is at the time of capture.

It is thus apparent that there is a need in the art for an improved method or apparatus which will enable a user to annotate a captured image or document, at the time of capture, with voice disposition commands for processing and disposing of the image or document, so that upon copying, or uploading, the image data file or document data file to a personal computer, the image data file or document data file will automatically be processed and disposed of according to the voice disposition commands stored in a voice command annotation file. The present invention meets these and other needs in the art.

SUMMARY OF THE INVENTION

It is an aspect of the present invention to use a voice pickup component integrated into a device to enable disposition commands to be made by voice and stored in a voice command annotation file for each image or document captured.

It is another aspect of the invention to copy an image data file or document data file, with its corresponding voice command annotation file, to a host computer.

Yet another aspect of the invention is to automatically process the voice command annotation file within the host computer after copying its associated image data file or document data file to a host computer, and execute a set of instructions corresponding to the voice disposition commands in the voice command annotation file.

Still another aspect of the invention is to distinguish a voice disposition command and a voice command annotation file, for an image data file or document data file, from a descriptive voice annotation and a voice annotation file for the same image data file or document data file.

A further aspect of the invention is to process the voice disposition command with voice analysis software within the device.

A still further aspect in another embodiment of the invention is to process the voice disposition command with voice analysis software within a host computer.

Another aspect of the invention is to make multiple voice disposition commands for the same image data file or document data file, and store the multiple voice disposition commands in the associated voice command annotation file.

A still further aspect of the invention is to process a voice command annotation file associated with a copied image data file or document data file, and execute instructions associated with the voice disposition commands in the voice command annotation file, wherein the user may be prompted for additional data input necessary to carry out the execution of the set of instructions.

Yet still another aspect of the invention is to distinguish between a voice disposition command and voice data input that is captured and stored in the voice command annotation file that is to be acted upon by instructions associated with the voice disposition command.

The above and other aspects of the invention are accomplished in devices that capture images or documents and store them as image data files or document data files in an internal memory. At the time the image or document is captured, the devices can receive voice disposition commands from the user that will govern the processing and disposition of the image data files or document data files after copying or uploading them to a host computer. Voice input is ideal for small devices which may not have enough space to provide any other kind of user interface.

For example, after scanning a document with a portable hand held document scanner, the user may make a voice disposition command, such as "fax" or "e-mail" or "print and save", by speaking into a voice pickup component, typically a microphone, in the portable scanner. The voice pickup component converts the captured audio input into an analog signal. The analog signal is converted into a digital signal through an analog-to-digital converter. The digital signal is processed by a controller, accessing voice analysis software, into a recognition pattern. The recognition pattern is then compared to a predetermined set of recognition patterns stored in internal memory. If there is no match, then the device outputs a message to the user that the voice disposition command is not valid. This may occur as a result of the user speaking too fast, too slow, too faint, too far away from the voice pickup component 102, or with an accent such that the resulting recognition pattern falls outside the tolerances built into the voice analysis software. Or, the user may be using a word for a command that has not been set up to be recognized by the device. In either case, the user may then try again to make a proper voice disposition command.

A valid recognition pattern is translated into a command number or command text and stored in a voice command annotation file in memory within the portable scanner in a way that associates the voice command annotation file to the document data file. Upon copying the document data file to a host computer, the voice command annotation file is automatically copied along with the document data file, and is detected by file transfer software running in the host computer. The file transfer software reads the command number or command text from the voice command annotation file and then executes one or more instructions associated with the command number or command text. In another embodiment of the invention, the voice disposition command is captured by the device and stored in an industry standard audio file format, such as WAV file. The WAV file is copied to the host computer along with the document data file. The WAV file is then converted by the file transfer software in the host computer into a recognition pattern and compared to the set of predetermined recognition patterns held in memory in the host computer. This embodiment reduces the complexity necessary within the device, but does not provide immediate feedback to the user regarding the validity of the voice command when given. If for some reason the recognition pattern generated from the WAV file does not match any of the predetermined recognition patterns held in memory, the use can listen to the WAV file and determine what the command was intended to be and then carry out the command manually.

There are various levels of sophistication inherent in different embodiments of the invention. In one embodiment, when the file transfer software processes a voice disposition command such as "e-mail", a prompt is sent for output on the graphics display of the host computer asking the user to type in the e-mail address the user wants the image data file or document data file sent to. When the user types in the e-mail address and hits the enter key, the file transfer software then accesses the e-mail utility in the host computer, and the document data file associated with the voice disposition command is e-mailed to the address entered by the user. Once all the commands in the voice annotation file are executed, the voice command annotation file is normally deleted.

In another embodiment of the invention, a voice disposition command such as "fax Bill Jones" is processed by the file transfer software and voice analysis software in the host computer and interpreted to mean fax the associated image data file or document data file to Bill Jones. The file transfer software looks up Bill Jones in the appropriate data base in the host computer that contains names and fax numbers, and retrieves the fax number for Bill Jones. The file transfer software then accesses the fax utility in the host computer, and the image data file or document data file associated with the voice command annotation file is faxed to Bill Jones using the fax number retrieved from the data base. Once all the commands in the voice command annotation file are executed, the voice command annotation file is normally deleted.

In yet another embodiment of the invention, a voice disposition command such as "fax four one eight seven five three four" is processed by the file transfer software and voice analysis software in the host computer and interpreted to mean fax the associated document data file to fax telephone number 418-7534. The file transfer software then accesses the fax utility in the host computer, and the document data file associated with the voice command annotation file is faxed to 418-7534. Once all the commands in the voice command annotation file are executed, the voice command annotation file is normally deleted.

In still another embodiment of the invention a device is trained to recognize the user's spoken commands through voice analysis software. The voice analysis software may be located within the device, or located on a host computer system and accessed by the device while tethered to the host computer system. In the preferred embodiment of the invention, the tethered mode is used to take advantage of the greater computing power available in the host computer system and to reduce the complexity required within the device.

For example, in using the voice analysis software in the training mode, the user would access a predetermined list of the functions that can be executed by the file transfer software with a voice disposition command. Command one, for example, may represent a set of instructions for performing a print function of an image data file or document data file. In selecting command one for training and analysis, the user would be prompted by the voice analysis software to choose a word that the user wants to use to invoke the set of instructions for the print function of command one. The user would then be prompted to repeat the chosen word a number of times. A logical choice would be to choose the word "print", but any word chosen by the user not already being used for a function could be employed. Each repetition of the word "print" is picked up by the device and analyzed by the voice analysis software to develop a recognition pattern to encompass the variations and inflections in the user's voice in speaking the word "print" for the print command. The recognition patterns for all the words chosen by the user to invoke the various functions are stored in memory in the host computer in a function recognition table. The recognition patterns in the function recognition table have command numbers or command text that are linked to the predetermined sets of instructions for the various functions, which are also stored in memory in the host computer. Thus, when the spoken voice disposition command word is recognized by the file transfer software, the command number or command text associated with the recognition pattern is used to access the set of instructions for the function represented by the command number or command text. This embodiment would enable foreign languages to be utilized for the voice disposition command words, since the set of instructions for a function are tied to the command number or command text, and the user's word choice, and subsequent training and voice analysis of that word choice.

In another embodiment of the invention, there is no word choice given the user for training and voice analysis. The recognition patterns in the function recognition table are predetermined and tied to specific command words the user must use. The user would have to modify his or her pronunciation of the command word "print", for example, until the device recognized the command word as spoken by the user to invoke the set of instructions associated with the print command. Thus, in this embodiment, the device would be primarily directed to a particular language where the command words were indicative or intuitive of the resulting actions. Foreign language versions of the device could be made for users utilizing foreign words indicative or intuitive of the resulting actions.

The devices have a voice audio input/output system under the control of a controller. Upon receiving a voice disposition command, the controller saves the digitized voice input in dynamic memory. The controller then processes the command and compares the recognition pattern for the voice disposition command with the recognition patterns stored in the function recognition table held in static memory. When a match is found, the command number or command text for the recognition pattern is stored in a voice command annotation file in static memory. Alternatively, in the absence of the compare step taking place in the device, the controller stores the voice input for the voice disposition command in an audio file format, such as a WAV file, and the WAV file is copied to a host computer along with its associated image data file or document data file.

Voice annotation is a partial solution to problem of determining the disposition of captured data. At the time the image or document is captured, voice description is captured in an audio file format and stored in a voice annotation file and associated with the image data file or document data file. The user indicates what the document or image is and its desired disposition. However, each image data file or document data file so annotated will need to be processed after copying to a host computer, and the attached voice annotation file played back and listened to, either by the user or some other person assisting the user, which is inefficient.

For devices that allow for voice annotation of captured documents and images, the devices of the present invention distinguish a voice disposition command from a voice annotation. In devices that can receive voice control commands to control the operation of the device, one voice control command is used for enabling the device to receive voice input for voice annotation, and a different voice control command is used to enable the device to receive voice input for a voice disposition command. In another embodiment of the invention, a use paradigm similar to a record button on a tape recorder is utilized. A button on the device is pressed and held down to signify that the following voice input is for voice disposition command purposes, and not a voice annotation or a voice control command. Another button on the device is pressed and held down to signify that the following voice input is for voice annotation purposes, and not a voice disposition command or a voice control command. Once the voice input is complete utilizing either button, the user releases the button, and the captured voice input is processed by the device and associated with the current image data file or document data file as a voice annotation file or a voice command annotation file, according to which button was pressed.

DESCRIPTION OF THE DRAWINGS

The above and other aspects, features, and advantages of the invention will be better understood by reading the following more particular description of the invention, presented in conjunction with the following drawings, wherein.

BEST MODE FOR CARRYING OUT THE INVENTION

The following description is of the best presently contemplated mode of carrying out the present invention. This description is not to be taken in a limiting sense but is made merely for the purpose of describing the general principles of the invention. The scope of the invention should be determined by referencing the appended claims.

Figure 1:
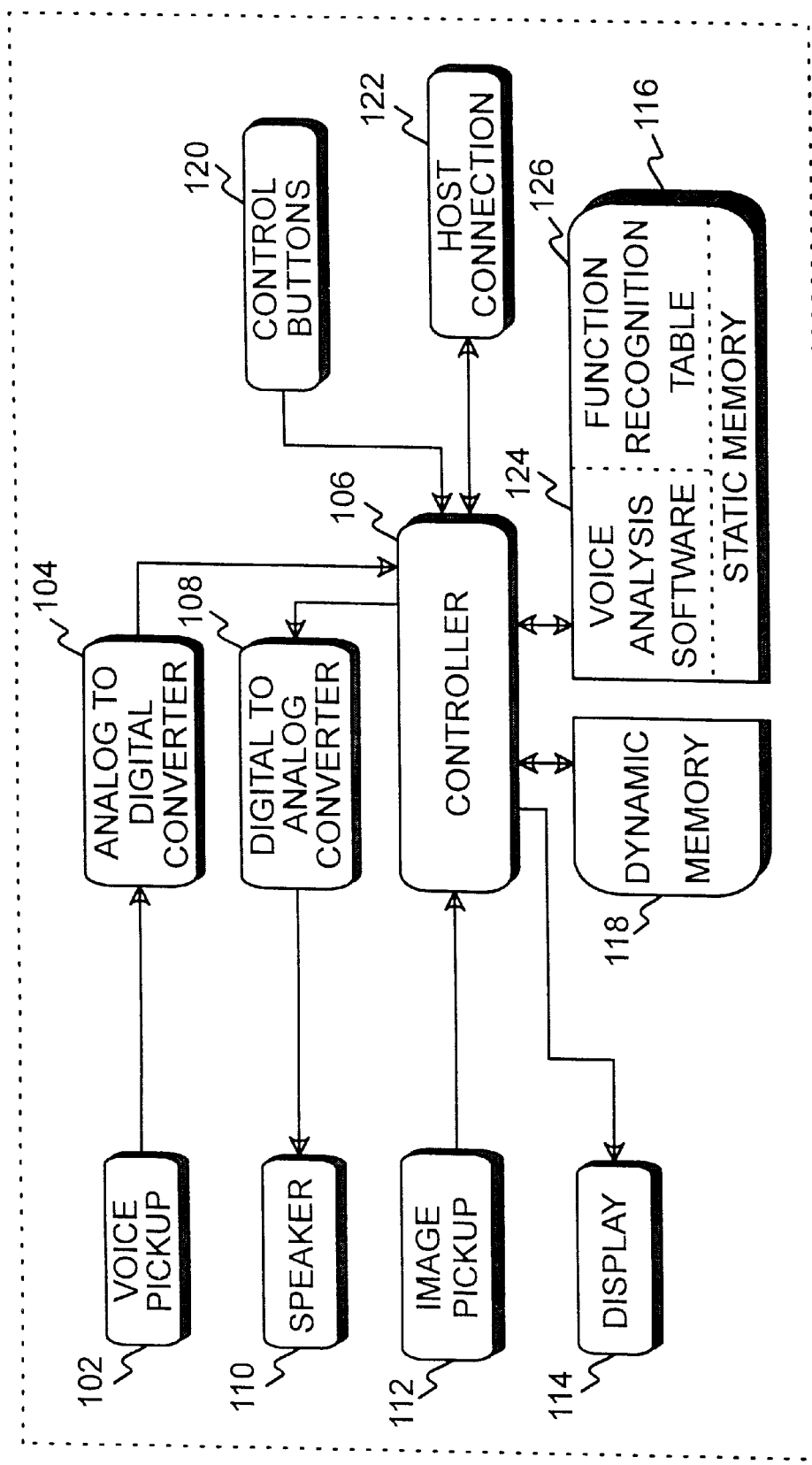
FIG. 1 shows a block diagram of a device of the present invention.

FIG. 1 shows a block diagram of a device of the present invention. Referring now to FIG. 1, device 100 is powered on by pressing a power on button, which is one of several control buttons 120 on device 100. Device 100 receives its power from internal batteries (not shown in FIG. 1), or alternatively through a power cable connected to device 100 and plugged into a power source (also not shown in FIG. 1). Device 100 could also be powered on through a voice command.

The user operates device 100 such that image pickup component 112 captures an image or document. For a portable hand held document scanner, the user would move the scanner such that image pickup component 112 comes in contact with a portion or all of the surface of the document to be scanned. Image pickup component 112 optically reads sample points from the surface of the document and generates a grey scale value for each point sampled. Controller 106 receives the grey scale values for the sample points and assembles them into an image array. The result may be output to display 114 connected to controller 106 showing a visual representation of the surface of the scanned document. Controller 106 may also convert the grey scale values to binary form for display or for storage. The image array, in either grey scale or binary form, is passed from controller 106 and stored as a document data file in static memory 116. One skilled in the art will recognize that the foregoing is also applicable to a device capable of capturing a color image utilizing RGB values for the sample points.

For a portable hand held digital camera, the user would aim the digital camera at the desired subject or scene and press one of the control buttons 120 for capturing and recording the light currently being reflected off of the subject or scene that is striking image pickup component 112. Controller 106 breaks down the picture image into a fixed number of pixels, tests each pixel for light intensity, and converts the intensity into a number. In a color digital camera, three numbers are created, representing the amount of red, green, and blue in each pixel. The pixels are assembled into an image array, and in a similar fashion to the scanner, the result may be output to display 114 showing a visual representation of the subject or scene. The image array, for either monochrome or color, is passed from controller 106 and stored as an image data file in static memory 116.

Voice disposition commands for either document data files or image data files are given by a user speaking in proximity to voice pickup component 102. Voice pickup component 102 converts the user's speech into an analog signal. Connected to voice pickup component 102 is an analog-to-digital converter 104, which converts the analog signal generated by voice pickup component 102 into a digital signal. The digital signal is sent by analog-to-digital converter 104 to controller 106, which stores the signal in dynamic memory 118. Then, in the preferred embodiment of the invention, controller 106 accesses voice analysis software 124 stored in static memory 116. Voice analysis software 124 performs a series of frequency domain transforms on the digital signal stored in dynamic memory 118 to generate a recognition pattern, which is a spectral transform. One skilled in the art will recognize that any other suitable method for recognizing voice patterns could be used in the present invention instead of spectral transforms.

The recognition pattern is compared to recognition patterns (also spectral transforms) stored in static memory 116 in function recognition table 126. In another embodiment of the invention, function recognition table 126 is not stored in device 100, but is stored instead in host computer system 200.

If there is a match, then controller 106 stores the command number or command text, found in function recognition table 126 and associated with the matched recognition pattern in dynamic memory 118, in a voice command annotation file. If there is no match, then the controller 106 indicates to the user that the voice disposition command given is not valid. This may be done by sending a message for output on display 114. Or, an audible message, consisting of beeps or words, may be output to the user. Digital-to-analog converter 108 converts the digital output signal from controller 106 into an analog signal, and speaker 110 converts the analog signal into audio output.

After capturing a document with device 100, in the preferred embodiment of the invention, the user may speak into voice pickup component 102 to make a voice disposition command, a voice annotation, or issue a voice control command. To distinguish between the three different purposes for voice input, in one embodiment of the invention, the user presses and holds down one of the control buttons 120 before speaking. One of the control buttons 120 is for making voice disposition commands, and another of the control buttons 120 is for making voice annotations. Voice input without either of these control buttons 120 pressed will be processed as a voice control command input. In either case, pressing either of the control buttons 120 sends button down input to controller 106, indicating that the following stream of voice input is either a voice disposition command or a voice annotation, depending upon which of the control buttons 120 was pressed, but not a voice control command input. After the user finishes speaking, the user releases the one of the control buttons 120 that was pressed. This sends button up input to controller 106, which makes the end of the voice input for either the voice disposition command or the voice annotation. The stream of voice input that was captured is stored either as a voice command annotation file or as a voice annotation file, depending upon which one of the control buttons 120 were pressed, and is associated with the captured image data file or document data file and stored in static memory 116 in device 100. One method of associating the image data file, or document data file, with an associated voice command annotation file or a voice annotation file is to give the files the same file name, but different file extensions. Multiple voice disposition commands for one image data file or one document data file may be stored in one voice command annotation file. Alternatively, multiple voice command annotation files may be associated with one image data file or one document data file. There could also be one of the control buttons 120 that the user would press to receive voice control commands.

In another embodiment of the invention, there is a voice control command for making a voice disposition command, and a voice control command for making a voice annotation. After issuing either voice control command, the following stream of voice input is captured and stored as either a voice command annotation file or as a voice annotation file, and associated with the image data file or document data file. When the user stops speaking for more than a predetermined period of time, such as between two to five seconds, the device interprets such predetermined period of absence of voice input as marking the end of the stream of voice input.

Upon receiving voice input of any type in voice pickup component 102, the voice input is converted to an analog signal. Analog-to-digital converter 104 converts the analog signal generated by voice pickup component 102 into a digital signal and sends the digital signal to controller 106. Controller 106 either processes the digital signal as a voice control command input, or processes and stores the digital signal in a voice command annotation file or in a voice annotation file in static memory 116, associating the image data file or document data file with either type of annotation file.

The user may request that device 100 play back the contents of a voice command annotation file or a voice annotation file. Controller 106 retrieves either file requested from static memory 116, passes it to digital-to-analog converter 108, which converts the digital signal stored in the file to an analog signal. The analog signal is passed to speaker 110, which generates audio output. In addition, a particular set of instructions for a command may send audible output to the user to acknowledge receipt of the command utilizing digital-to-analog converter 108 and speaker 110, or acknowledge the command by illuminating a light emitting diode (LED) (not shown in FIG. 1).

Image data files, document data files, voice annotation files, and voice command annotation files, may be copied to another device, such as host computer system 200 (FIG. 2) through host connection 122, which is connected to controller 106.

Figure 2:
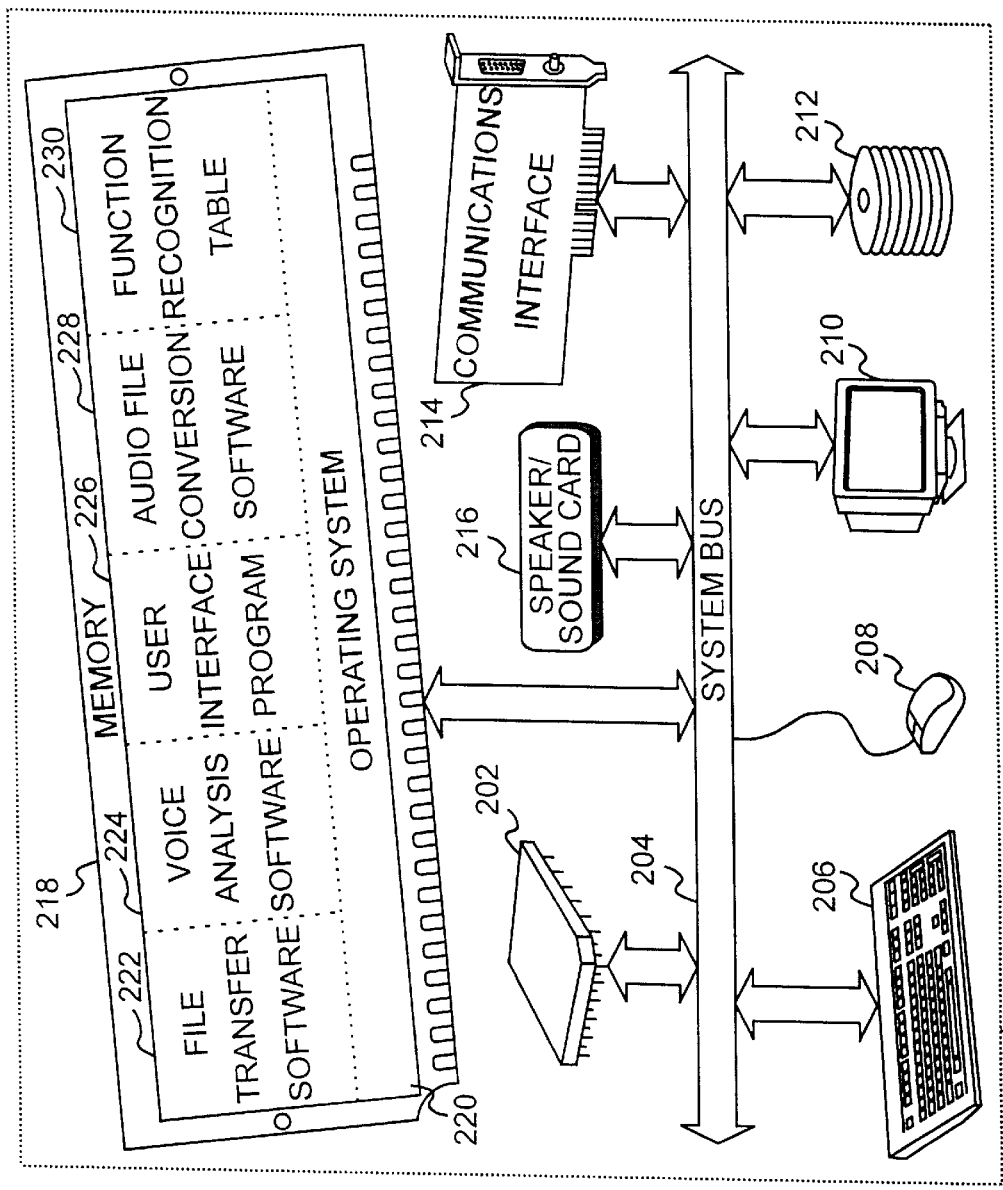
FIG. 2 shows a block diagram of a host computer system in communication with a device of the present invention.

FIG. 2 shows a block diagram of a host computer system in communication with a device of the present invention. Referring now to FIG. 2, host computer system 200 contains a processing element 202. Processing element 202 communicates to other elements of host computer system 200 over a system bus 204. A keyboard 206 allows a user to input information into host computer system 200 and a graphics display 210 allows host computer system 200 to output information to the user. A mouse 208 is also used to input information, and a storage device 212 is used to store data and programs within host computer system 200. Communications interface 214, also connected to system bus 204, receives information from host connection 122 of device 100 (FIG. 1). Speaker/sound card 216, connected to system bus 204, outputs audio information to the user. Some host computer systems may not have a sound card, in which case the speaker is driven only by software. A memory 218, also attached to system bus 204, contains an operating system 220, file transfer software 222, voice analysis software 224, user interface program 226, audio file conversion software 228, and function recognition table 230. In another embodiment of the invention, function recognition table 230 is not stored in host computer system 200, but is instead stored in device 100.

File transfer software 222 receives image data files, document data files, voice command annotation files, and voice annotation files copied from device 100 through host connection 122 (FIG. 1), through communications interface 214 and over system bus 204, and saves them in storage device 212. File transfer software 222 then begins processing all voice command annotation files copied to storage device 212.

For the embodiment of the invention where the voice command annotation file is in a WAV format, file transfer software 222 first processes the voice command annotation file to generate a recognition pattern for each of the commands it contains. File transfer software 222 compares the recognition patterns from the voice command annotation file with the recognition patterns stored in function recognition table 230. When a match is found, file transfer software 222 then begins executing the set of instructions associated with the command number or command text for the recognition pattern found in function recognition table 230. For the embodiment of the invention where device 100 performs the voice analysis of the voice disposition command input, the command number or command text from the copied voice command annotation file is accessed by file transfer software 222 and the corresponding set of instructions are executed.

User interface program 226 allows the user to select an image data file or document data file having a voice annotation file. Audio file conversion software 228 converts the voice annotation file to an audio file format recognizable by speaker/sound card 216. Speaker/sound card 216 outputs the audio information to the user. After hearing the audio information, the user may choose to view the image data file or document data file. If so, user interface program 226 is suspended, the application program associated with the image data file or document data file is called, and the image data file is displayed in graphics display 210.

In the preferred embodiment of the invention, voice analysis software 224 is used by a user to train device 100 to recognize the user's voice disposition commands and voice control commands in any language. Device 100 is first connected to host computer system 200. The user then accesses voice analysis software 224 and selects a particular function to train, to be represented by a word chosen by the user to invoke the function. The user then repeats the word chosen by the user to invoke the function a number of times. The word most likely to be chosen by the user is the word, in whatever language the user speaks, that is equivalent or closest to the particular function chosen. The user's repetition of the word for the function is captured by voice pickup component 102 (FIG. 1), is processed in device 100 into a digital signal, and transferred via host connection 122 to communications interface 214. Communications interface 214 transfers each digital signal via system bus 204 to memory 218, where voice analysis software 224 analyzes each digital signal. Voice analysis software 224 develops a recognition pattern based on a combination of each sample signal to encompass the variations and inflections in the user's voice in speaking the word chosen to invoke the function. This process is repeated for each of the predetermined functions that can be used for issuing a voice disposition command with device 100. The recognition patterns established for all the words chosen for training are stored in function recognition table 230 and associated with a unique command number or command text. Depending upon the embodiment of the invention, the function recognition table for voice disposition commands may be downloaded from host computer system 200 to device 100, and stored in static memory 116, or kept in host computer system 200.

Figure 3:
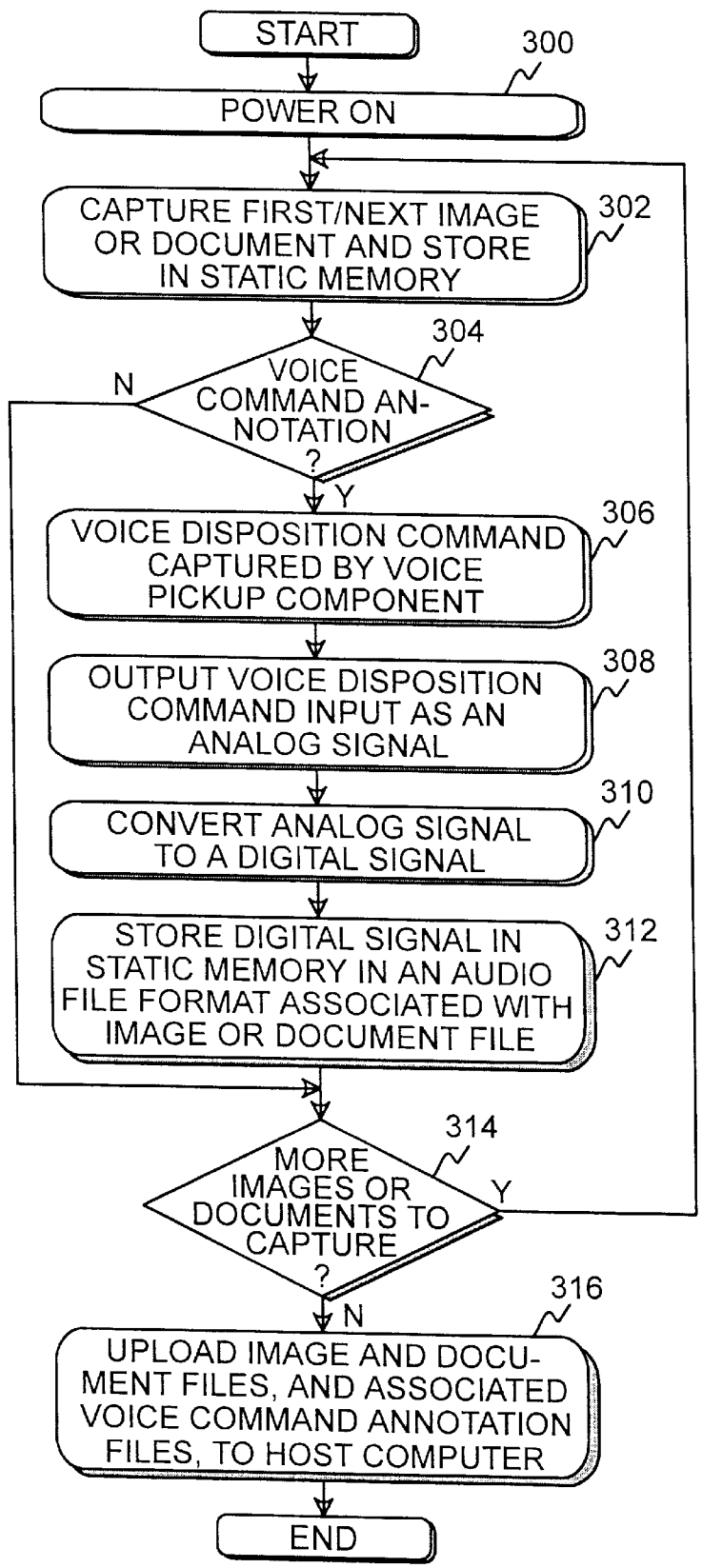
FIG. 3 shows a flow chart of an embodiment of a device of the present invention that does not perform voice analysis on voice disposition commands within the device.

FIG. 3 shows a flow chart of an embodiment of a device of the present invention that does not perform voice analysis on voice disposition commands within the device. Referring now to FIG. 3, in step 300 device 100 (FIG. 1) is powered on. In step 302 a first image or document is captured with device 100 and stored in static memory 116 (FIG. 1) as an image data file or a document data file. Step 304 determines if an indication is received in controller 106 (FIG. 1) that a voice disposition command is to be made for the image data file or document data file stored in step 302. Such an indication could be made by controller 106 receiving button down input from one of the control buttons 120 (FIG. 1) for voice disposition commands. Or, a voice control command input could be received by controller 106 for making a voice disposition command. If such an indication is not received in step 304, then control passes to step 314.

If an indication for making a voice disposition command is received in step 304, then in step 306 voice pickup component 102 (FIG. 1) captures the voice disposition command input. In step 308 voice pickup component 102 outputs the voice disposition command input as an analog signal to analog-to-digital converter 104. In step 310, analog-to-digital converter 104 converts the analog signal to a digital signal, and outputs the digital signal to controller 106. In step 312 controller 106 stores the digital signal in static memory 116 in an audio file format, such as a WAV file. The WAV file, and the image data file or document data file that the voice annotation command was made for, are associated with each other. One way of doing so is to give both files the same file name, but different file extensions. Since the same image data file or document data file may have both a voice annotation file and a voice command annotation file, the voice annotation file would have a different file extension from the voice command annotation file, but all three would have the same file name. Multiple voice command annotation files may be associated with one image data file or one document data file by adding an extension to the file extension, such as "???????.WAV.ONE", or adding a parameter to the file extension, such as "???????.WAV1".

Step 314 determines if an indication is received in controller 106 for capturing another image or document. If such an indication is received, then control returns to step 302 where the next image or document is captured and stored. If instep 314 no indication is received in controller 106 for capturing another image or document, then in step 316 the captured image data files, document data files, voice annotation files, and voice command annotation files are copied from device 100 to host computer system 200, over an established connection which utilizes host connection 122 (FIG. 1) and communications interface 214 (FIG. 2). Such a connection may be through a wire cable or an infra-red beam, or any other suitable connection. All the files could be copied, or just those files individually selected by the user. Whenever an image data file or document data file is copied, any associated voice annotation files or voice command annotation files are automatically copied with the image data file or document data file. One skilled in the art will recognize that a considerable amount of time may pass between steps 314 and 316, such as when a user is on a trip capturing images or documents, and then travels home, and then begins copying data to host computer system 200. After copying files to host computer system 200, device 100 is powered off and its operation ends.

Figure 4A:
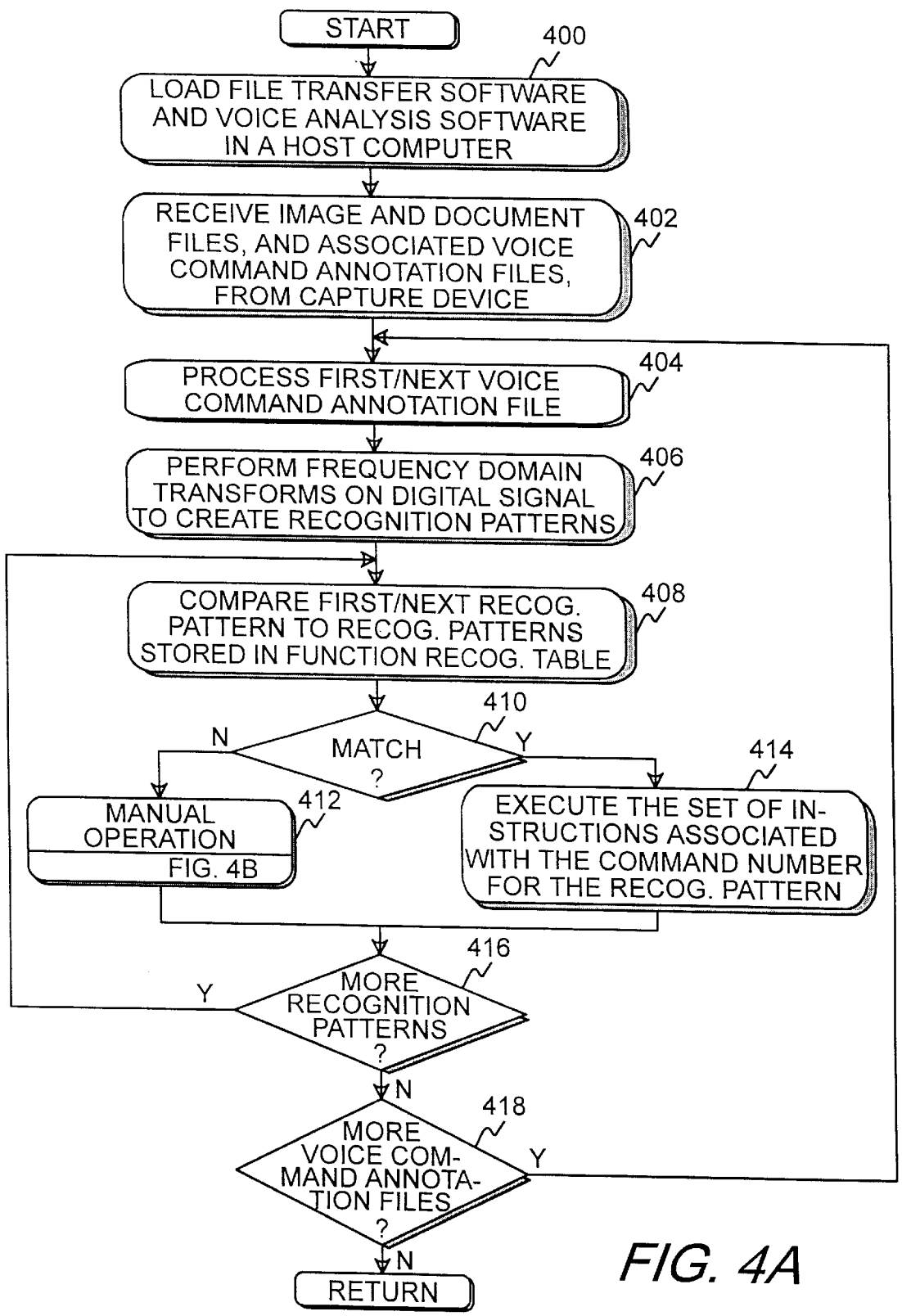
FIGS. 4A and 4B show a flow chart of a host computer that performs voice analysis on the voice disposition commands contained in voice command annotation files copied from the device of FIG. 3.
Figure 4B:
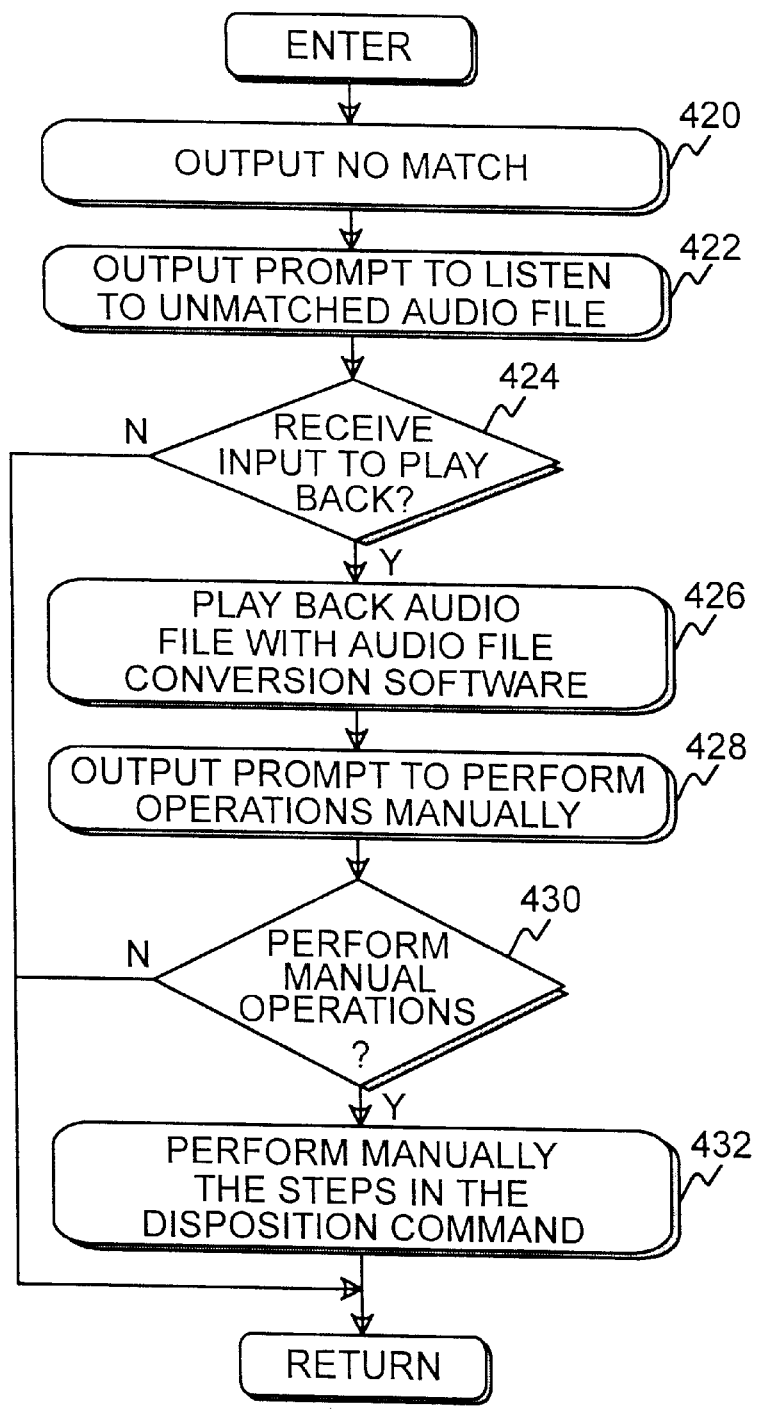

FIGS. 4A and 4B show a flow chart of a host computer that performs voice analysis on the voice disposition commands contained in voice command annotation files copied from the device of FIG. 3. Referring now to FIG. 4, in step 400 file transfer software 222 and voice analysis software 224 are loaded into memory 218 of host computer system 200 (FIG. 2). In step 402 host computer system 200 receives image data files, document data files, voice annotation files, and voice command annotation files from step 316 in FIG. 3 into memory 218. File transfer software 222 then begins processing the first voice command annotation file received in step 402. In step 406 voice analysis software 224 is called to perform a series of frequency domain transforms on the first digital signal stored in the first voice command annotation file in order to generate a recognition pattern for the digital signal. In step 408, file transfer software 222 compares the recognition pattern generated in step 406 to a number of recognition patterns, representing functions, in function recognition table 230 (FIG. 2) stored in memory 218. Step 410 determines if there is a match between the recognition pattern generated in step 406 and any of the recognition patterns stored in function recognition table 230. Reasons for not finding a match for a valid voice command annotation include the user speaking too fast, too slow, too faint, too far away from the voice pickup component 102, or with an accent such that the resulting recognition pattern falls outside the tolerances built into the voice analysis software. If no match is found in step 410, then step 412 calls FIG. 4B to allow the user the opportunity to perform manually the steps that the user intended to be performed automatically. After returning from FIG. 4B, control then passes to step 416.

If in step 410 a match was found, then in step 414 the command number or command text stored in function recognition table 230 associated with the recognition pattern stored in function recognition table 230 is used to access the instruction or set of instructions for the function represented by the command number or command text. The set of instructions are also stored in function recognition table 230. File transfer software 222 then executes the set of instructions.

Step 416 determines if there are more recognition patterns within the first voice command annotation file that need to be compared. If the answer is yes, control returns to step 408 where the next recognition pattern is compared to the recognition patterns in function recognition table 230. If there are no more recognition patterns to compare in step 416, then step 418 determines if there are more voice command annotation files to be processed. If there are more voice command annotation files to be processed, control returns to step 404. If in step 418 there are no more voice command annotation files to be processed, control returns to operating system 220.

FIG. 4B is called from step 412 in FIG. 4A. In step 420 an indication of no match found is output to the user. The indication could be a text message output to graphics display 210, or an audio message output to speaker/sound card 216 (FIG. 2). In step 422 a prompt is output to the user where the user can select to listen to the audio file where no match was found. Step 424 determines if input is received indicating a desire by the user to play back the audio file. If not, control returns to step 416 of FIG. 4A. If input is received from the user selecting play back, then in step 426 audio file conversion software 228 is called to play back the contents of the voice command annotation file from step 404.

After listening to the voice command annotation stored in the voice command annotation file, in step 428 a prompt is output to the user where the user can select to perform manually the operations that would have been performed automatically if the recognition pattern generated in step 406 had matched any recognition patterns stored in the function recognition table. Step 430 determines if input is received indicating a desire by the user to perform operations manually. If not, control returns to step 416 of FIG. 4A. If input is received form the user selecting to perform operations manually, then in step 432 the user performs the operations desired manually. After the user performs these operations, control returns to step 416 of FIG. 4A.

For example, suppose that upon play back in step 426, the user hears as audio output "fax to Bill Jones". If the user selects to perform manual operations in step 430 in response to the prompt of step 428, then in step 432 the user would manually access the fax utility, enter the fax number for Bill Jones, and fax the image data file or document data file associated with the voice command annotation file.

Figure 5A:
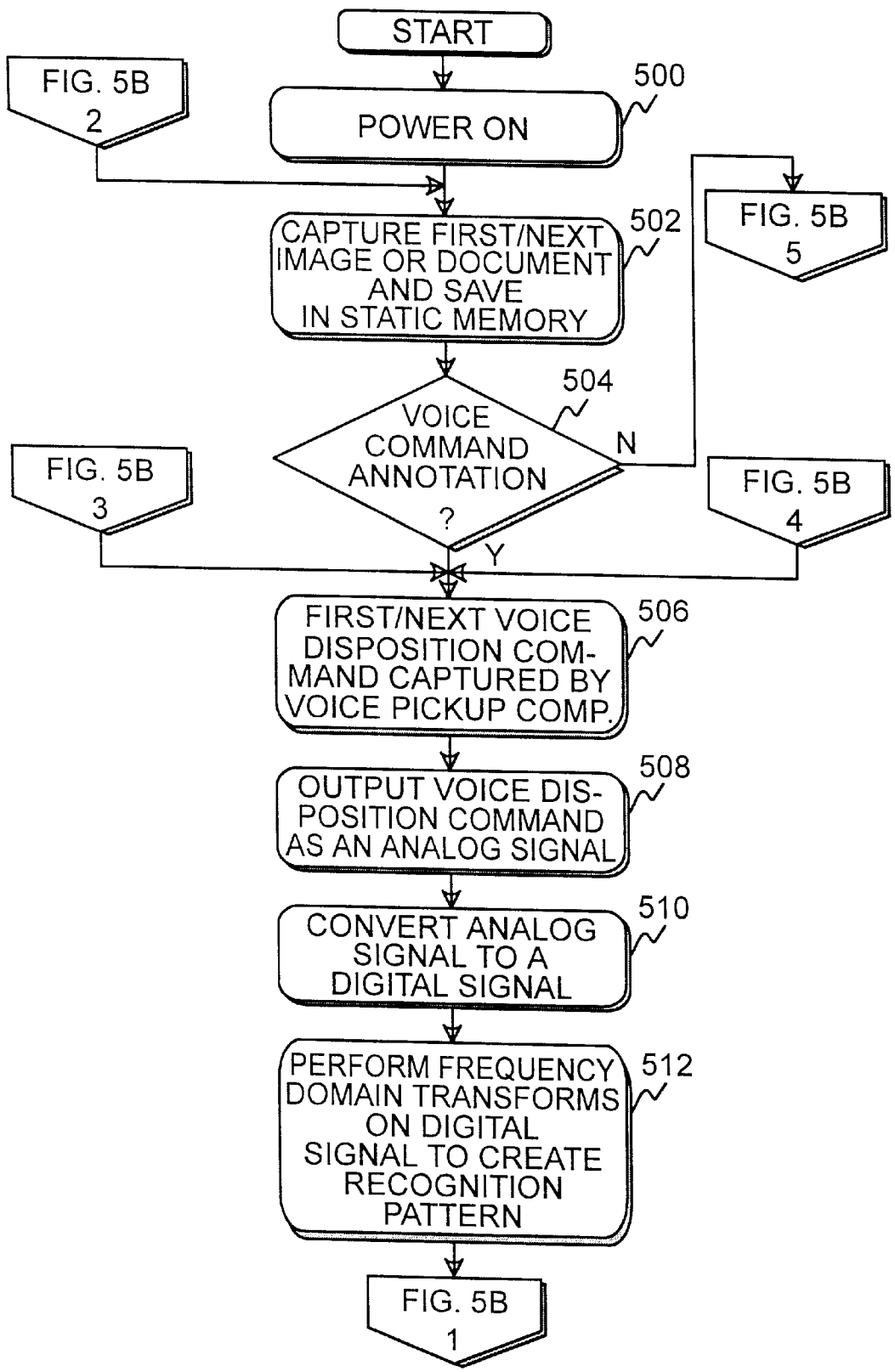
FIGS. 5A and 5B show a flow chart of an embodiment of a device of the present invention that performs voice analysis on voice disposition commands within the device.
Figure 5B:
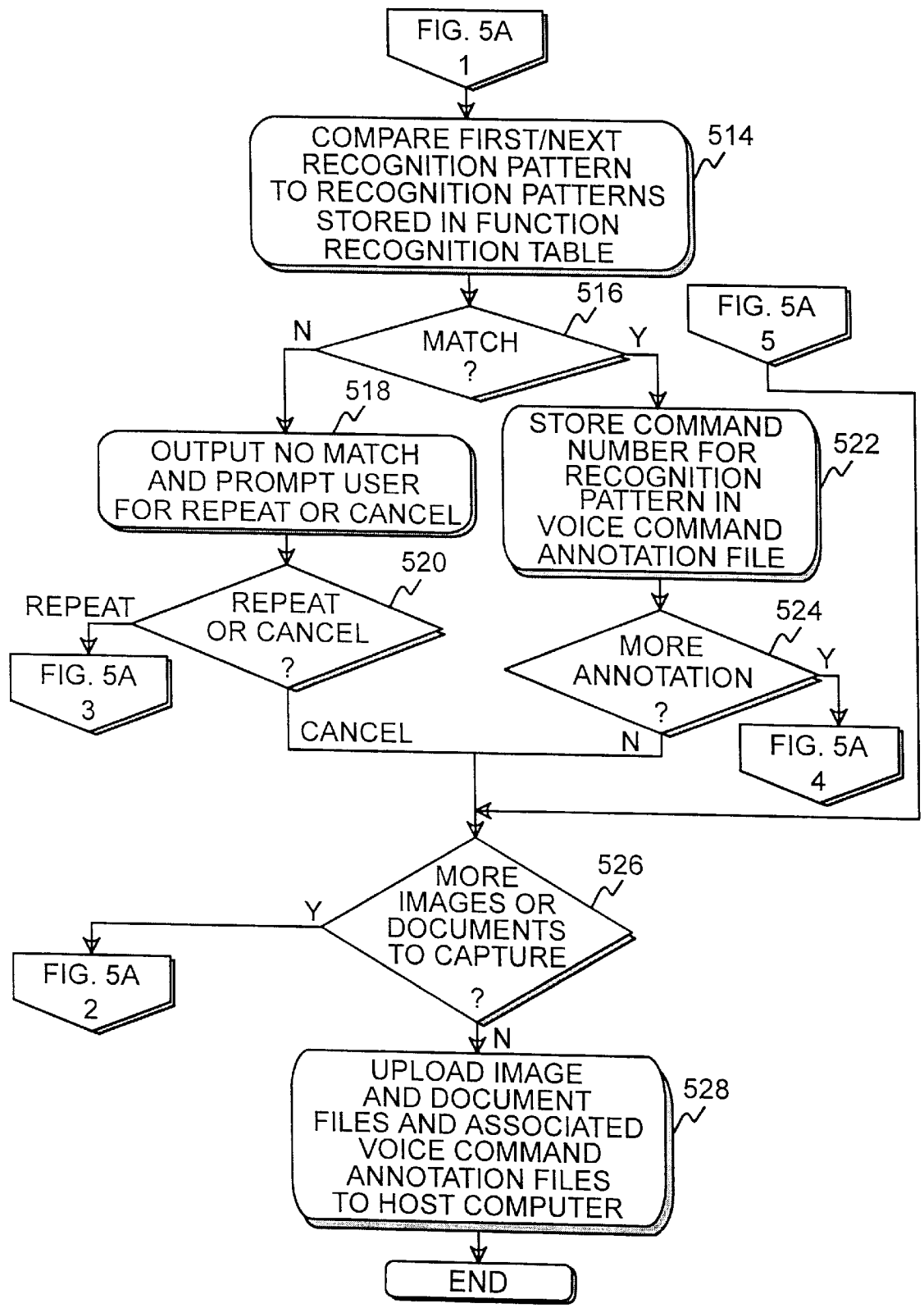

FIGS. 5A and 5B show a flow chart of an embodiment of a device of the present invention that performs voice analysis on voice disposition commands within the device. Referring now to FIGS. 5A and 5B, in step 500 device 100 (FIG. 1) is powered on. In step 502 a first image or document is captured with device 100 and stored in static memory 116 (FIG. 1) as an image data file or a document data file. Step 504 determines if an indication is received in controller 106 (FIG. 1) that a voice disposition command is to be made for the image data file or document data file stored in step 502. Such an indication could be made by controller 106 receiving button down input from one of the control buttons 120 (FIG. 1) for voice disposition commands. Or, a voice control command could be received by controller 106 for making a voice disposition command.

If such an indication is not received in step 504, then control passes to step 526. If an indication for making a voice disposition command is received in step 504, then in step 506 voice pickup component 102 (FIG. 1) captures the first voice disposition command input. In step 508 voice pickup component 102 outputs the voice disposition command input as an analog signal to analog-to-digital converter 104 (FIG. 1). In step 510, analog-to-digital converter 104 converts the analog signal to a digital signal, and outputs the digital signal to controller 106.

In step 512 controller 106 calls voice analysis software 124 in static memory 116 (FIG. 1) to perform a series of frequency domain transforms on the first digital signal stored in the first voice command annotation file in order to generate a recognition pattern for the digital signal. In step 514, the recognition pattern so generated is compared to recognition patterns for functions in function recognition table 126 (FIG. 1) stored in static memory 116. Step 516 determines if there is a match between the recognition pattern generated in step 514 and any of the recognition patterns stored in function recognition table 126. If no match is found in step 516, then in step 518 an indication of no match found is output to the user, along with a prompt for the user to repeat the voice annotation command input or to cancel. The indication could be a text message output to display 114, or an audio message output to speaker 110 (FIG. 1). Step 520 then determines if an indication to repeat or to cancel is received in controller 106. If an indication to repeat is received in step 520, then control passes to step 506 where the repeated voice disposition command input is captured by voice pickup component 102. If an indication to cancel is received in step 520, control passes to step 526.

If in step 516 a match was found, then in step 522 the command number or command text stored in function recognition table 126 that is associated with the recognition pattern stored in function recognition table 126 is stored in a voice command annotation file. The voice command annotation file is associated with the image data file or document data file. Step 524 then determines if there is more voice disposition command input for the image data file or document data file stored in step 502. If the answer is yes, control returns to step 506 where the next voice disposition command input is captured by voice pickup component 102. If the answer in step 524 is no, then control passes to step 526.

Step 526 determines if there is an indication that a next image or document is to be captured by device 100. If the answer is yes, then control returns to step 502 where the next image or document is captured by device 100 and stored in static memory 116. If the answer in step 526 is no, then in step 528, the captured image data files, document data files, voice annotation files, and voice command annotation files are copied from device 100 to host computer system 200, over an established connection which utilizes host connection 122 and communications interface 214. One skilled in the art will recognize that a considerable amount of time may pass between steps 526 and 528, such as when a user is on a trip capturing images or documents, and then travels home, and then begins copying data to host computer system 200. After copying files, device 100 is powered off and its operation ends.

Figure 6:
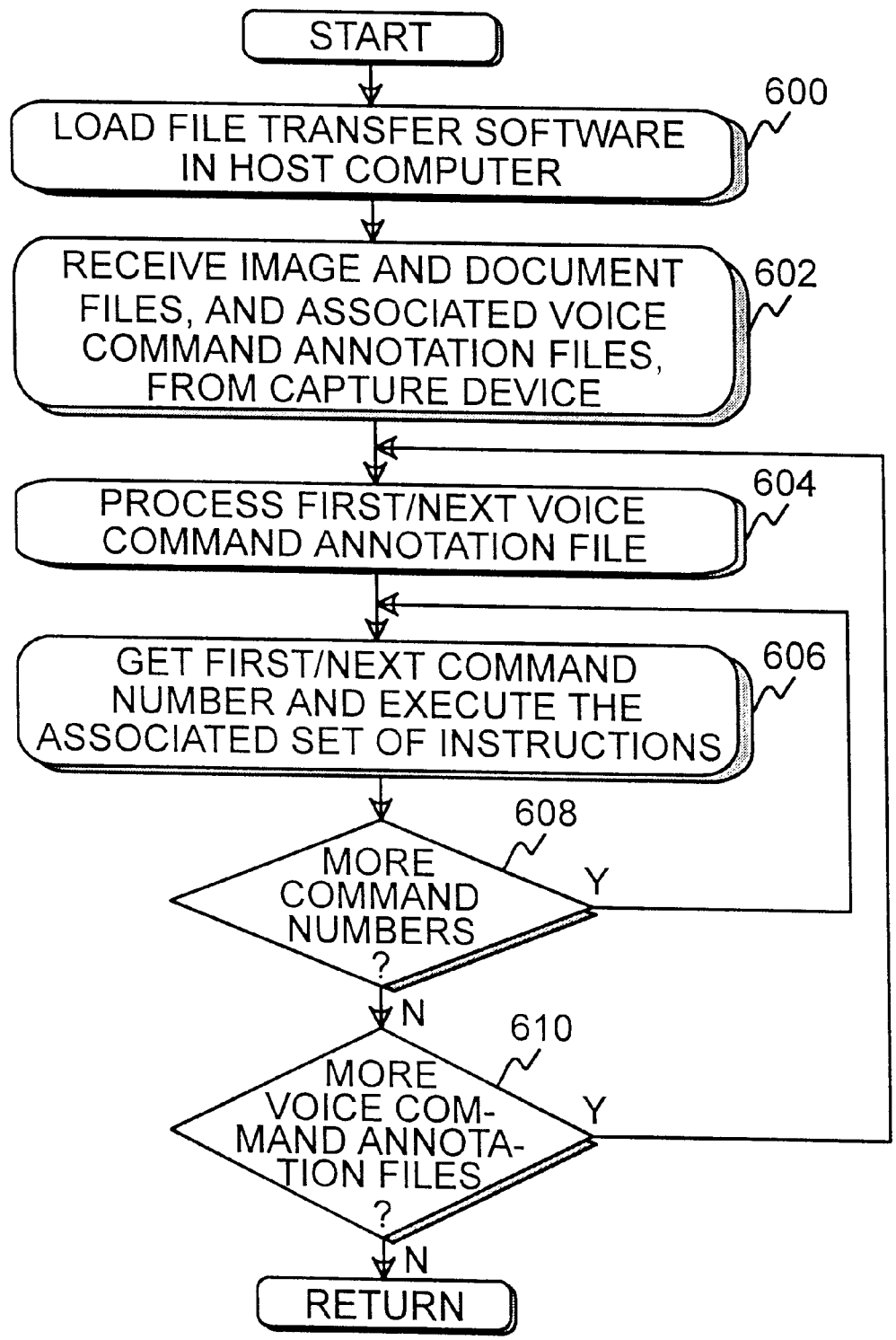
FIG. 6 shows a flow chart of a host computer that receives voice command annotation files where voice analysis has already been performed by the device of FIGS. 5A and 5B.

FIG. 6 shows a flow chart of a host computer that receives voice command annotation files where voice analysis has already been performed by the device of FIGS. 5A and 5B. Referring now to FIG. 6, in step 600 file transfer software 222 is loaded into memory 218 of host computer system 200 (FIG. 2). In step 602 host computer system 200 receives image data files, document data files, voice annotation files, and voice command annotation files from step 528 in FIG. 5 into memory 218. In step 604, file transfer software 222 then begins processing the first voice command annotation file received in step 602. In step 606 the first command number or command text in the first voice command annotation file is used to access the instruction or set of instructions associated with the command number or command text that is stored in function recognition table 230 (FIG. 2).

After the one or more instructions have been executed in step 606, step 608 determines if there are more command numbers or command text in the first voice command annotation file from step 604. If there are more command numbers or command text, then control returns to step 606 to access and execute the next set of instructions associated with the next command number or command text. If in step 608 there are no more command numbers or command text, then step 610 determines if there are more voice command annotation files to be processed. If the answer is yes, then control returns to step 604 where the next voice command annotation file is processed. If the answer in step 610 is no, then control returns to operating system 220.

Figure 7:
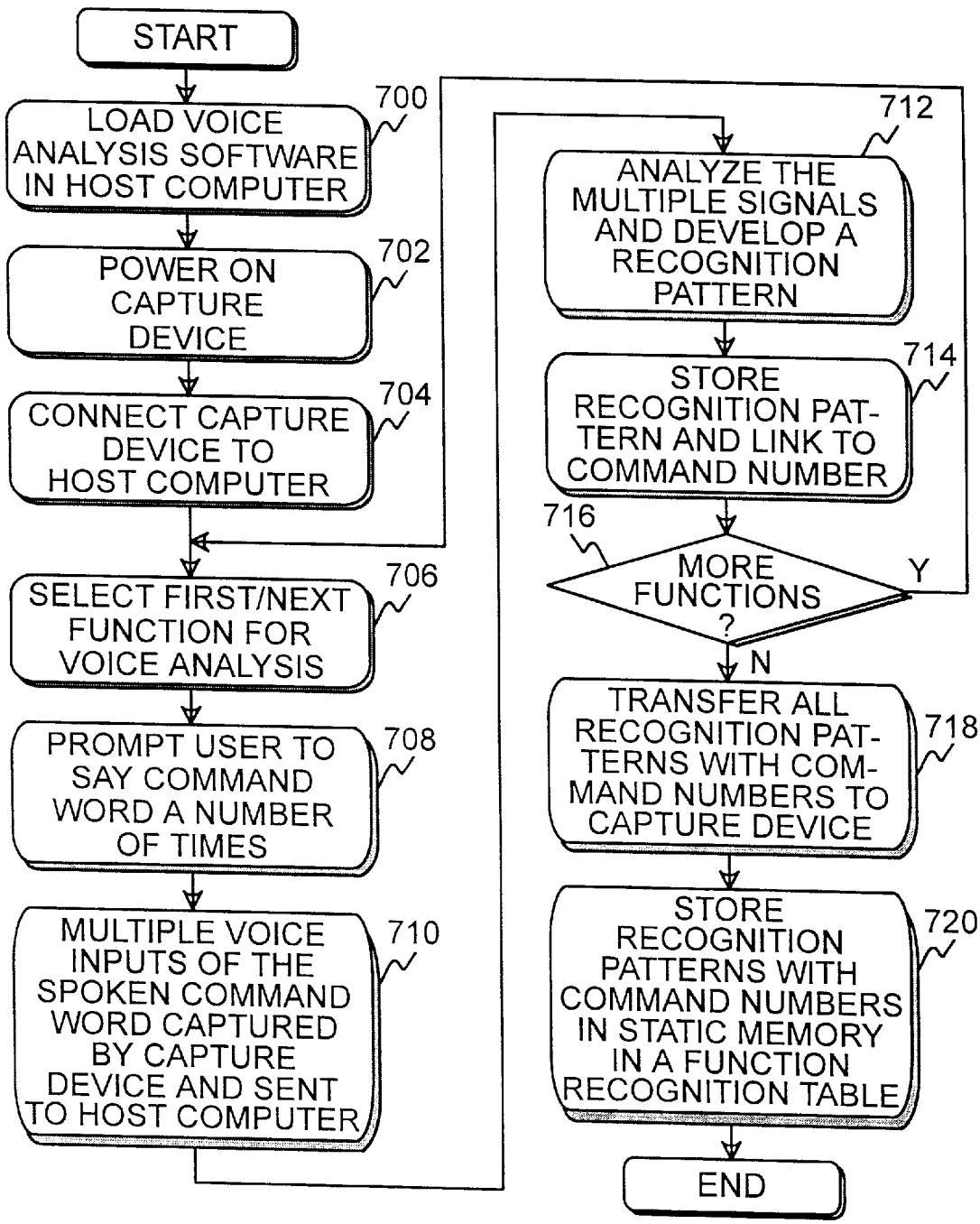
FIG. 7 shows a flow chart of training a device of the present invention to recognize a user's voice disposition command inputs.

FIG. 7 shows a flow chart of training a device of the present invention to recognize a users voice disposition command inputs. Referring now to FIG. 7, in step 700 voice analysis software 224 is loaded into memory 218 in host computer system 200 (FIG. 2). Device 100 (FIG. 1) is powered on in step 702. In step 704 device 100 is connected to host computer system 200. This could be through a wire cable, an infra-red beam, or any other suitable connection. In step 706, input from a user is received in voice analysis software 224 selecting a first function by its command number or command text for training and voice analysis. Voice analysis software 224 then prompts the user in step 708 to audibly repeat the command word the user has chosen to invoke the first function into voice pickup component 102 (FIG. 1) of device 100 a multiple number of times. In step 710, the multiple voice inputs captured by voice pickup component 102 are processed by device 100 into digital signals and sent to voice analysis software 224 in host computer system 200. The voice analysis software 224 in step 712 analyzes the multiple digital signals received in step 710 and develops a recognition pattern for the command word. The recognition pattern of step 712 is stored in memory 218 in step 714.

Step 716 determines if the user has selected a next function for training and voice analysis, or if an indication is received that the user is done selecting functions for training and voice analysis. If a next function has been selected in step 716, control returns to step 706. If an indication is received that the user is done selecting functions, then in step 718 voice analysis software 224 transfers all recognition patterns determined in step 712 and stored in step 714, and the command number or command text associated with each function, to device 100 over the connection established in step 704. In step 720 the recognition patterns and their associated command numbers or command text transferred in step 718 are stored in static memory 116 in a function recognition table 126 (FIG. 1). The recognition pattern and command number or command text for each function are linked to the set of instructions that will be executed upon receiving the voice control command input that, when processed into a recognition pattern, matches one of the recognition patterns determined in step 712. After step 720 training and voice analysis of device 100 ends.

In another embodiment of the invention, training of the device of the present invention to recognize a user's voice disposition command inputs can be accomplished without being tethered to a host computer. This is accomplished by having voice analysis software 124 stored in static memory 116, and following the steps outlined above except for the steps relating to a host computer.

Having thus described a presently preferred embodiment of the present invention, it will be understood by those skilled in the art that many changes in construction and circuitry and widely differing embodiments and applications of the invention will suggest themselves without departing from the scope of the present invention as defined in the claims. The disclosures and the description herein are intended to be illustrative and are not in any sense limiting of the invention, defined in scope by the following claims.

What is claimed is:

1. A voice command annotation method for a device, said method comprising the steps of:
  (a) capturing a voice disposition command with a voice pickup component in said device;
  (b) storing said voice disposition command in a voice command annotation file;
  (c) associating said voice command annotation file with a data file in said device;
  (d) copying said data file and said voice command annotation file from said device to a host computer system;
  (e) processing said voice command annotation file in said host computer system to identify at least one function associated with said voice disposition command, comprising the steps of
    (e1) generating a first recognition pattern representative of said voice disposition command,
    (e2) comparing said first recognition pattern to at least one recognition pattern for said at least one function stored in a function recognition table in said memory in said host computer system,
    (e3) when said first recognition pattern matches said at least one recognition pattern for said at least one function stored in said function recognition table, retrieving a command number associated with said at least one recognition pattern, and (e4) accessing, through said command number, said at least one instruction, wherein said at least one instruction is linked to said command number; and (f) executing at least one instruction associated with said at least one function, wherein said at least one instruction acts upon said data file.

2. The voice command annotation method for a device according to claim 1 wherein step (a) further comprises the step (a1), step (b) further comprises the step (b1), step (e) replaces step (e), and step (f) further comprises the step (f1):

(a1) capturing a plurality of additional voice disposition commands with said voice pickup component in said device;

(b1) storing said plurality of additional voice disposition commands in said voice command annotation file;

(e) processing said voice command annotation file in said host computer system to identify a plurality of functions, wherein one of each of said plurality of functions is associated with one of each of said plurality of additional voice disposition commands, said processing comprising the steps of; and (f1) executing a plurality of additional at least one instructions, wherein one of each of said plurality of additional at least one instruction is associated with said one of each of said plurality of additional functions, and further wherein each of said plurality of additional at least one instruction acts upon said data file.

3. The voice command annotation method for a device according to claim 1 wherein step (a) further comprises the steps (a1) through (a3), step (b) further comprises the step (b1), and step (c) further comprises the step (c1):

(a1) outputting, from said voice pickup component, said voice disposition command as an analog signal to an analog-to-digital converter in said device;

(a2) converting said analog signal in said analog-to-digital converter to a digital signal;

(a3) outputting said digital signal from said analog-to-digital converter to said controller;

(b1) storing, by said controller, said digital signal in said voice command annotation file in a static memory in said device, wherein said voice command annotation file is an audio file format; and (c1) associating said data file and said voice command annotation file by giving said data file and said voice command annotation file a same file name, and giving said data file a first file extension name, and giving said voice command annotation file a second file extension name.

4. The voice command annotation method for a device according to claim 1 wherein step (e2) further comprises the steps (e2a) through (e2c):

(e2a) when said first recognition pattern does not match said at least one recognition pattern for said at least one function stored in said function recognition table, outputting a first message in said host computer system indicating that no match was found, and outputting a second message in said host computer system prompting for input to listen to said voice command annotation file;

(e2b) when said input to listen from step (e2a) is received, calling audio file conversion software to process said voice command annotation file for audio output, and outputting a third message in said host computer system prompting for input for manual operations; and (e2c) when said input for manual operations from step (e2b) is received, suspending said voice command annotation method until manual operations are performed.

5. The voice command annotation method for a device according to claim 1 wherein said command number is a command text.

6. The voice command annotation method for a device according to claim 1 wherein said device is a portable scanner device.

7. The voice command annotation method for a device according to claim 1 wherein said device is a digital camera.

8. The voice command annotation method for a device according to claim 1 wherein step (a) further comprises the step (a0) performed before step (a):

(a0) receiving a voice control command in said device to enable said device to capture said voice disposition command with said voice pickup component.

9. The voice command annotation method for a device according to claim 1 wherein step (a) further comprises the step (a0) performed before step (a), and step (b) further comprises the step (b1):

(a0) receiving button down input in said controller from an annotation control button on said device, wherein said device is enabled to capture said voice disposition command with said voice pickup component;

(b1) receiving button up input in said controller from said annotation control button on said device, wherein said device is disabled from capturing said voice disposition command with said voice pickup component.

10. A voice command annotation method for a device, said method comprising the steps of:

(a) capturing a voice disposition command with a voice pickup component in said device;

(b) processing said voice disposition command with a controller in said device comprising the steps of (b1) calling, by said controller, voice analysis software from a memory in said device, (b2) generating a first recognition pattern, wherein said first recognition pattern is representative of said voice disposition command, (b3) comparing said first recognition pattern to at least one recognition pattern for said at least one function stored in a function recognition table in said memory in said device, (b4) when said first recognition pattern matches said at least one recognition pattern for said at least one function stored in said function recognition table, retrieving a command number stored in said memory associated with said at least one recognition pattern;

(c) storing said voice disposition command processed with said controller in a voice command annotation file, comprising the step of (c1) storing, by said controller, said command number in said voice command annotation file in said memory in said device;

(d) associating said voice command annotation file with a data file in said device;

(e) copying said data file and said voice command annotation file from said device to a host computer system;

(f) processing said voice command annotation file in said host computer system to identify at least one function associated with said command number; and (g) executing at least one instruction associated with said at least one function, wherein said at least one instruction acts upon said data file.

11. The voice command annotation method for a device according to claim 10 wherein step (b3) further comprises the steps (b3a) and (b3b):

(b3a) when said first recognition pattern does not match said at least one recognition pattern for said at least one function stored in said function recognition table, outputting a first message in said device indicating that no match was found; and (b3b) outputting a second message in said device prompting for input to repeat said voice disposition command or to cancel.

12. The voice command annotation method for a device according to claim 10 wherein said command number is a command text.

13. The voice command annotation method for a device according to claim 10 wherein step (e) further comprises the steps (e0) performed before step (e) and step (e1) performed after step (e), and step (f) further comprises the steps (f1) through (f2):

(e0) loading file transfer software in a memory in said host computer system;

(e1) receiving, through said file transfer software, said data file and said voice command annotation file into said memory in said host computer system;

(f1) retrieving said command number from said voice command annotation file with said file transfer software; and (f2) accessing said at least one instruction, stored in said function recognition table in said memory, through said command number, wherein said at least one instruction is linked to said command number.

14. The voice command annotation method for a device according to claim 10 wherein step (a) further comprises the steps (a0a) through (a0j) performed before step (a):

(a0a) loading voice analysis software into a memory in a host computer system;

(a0b) connecting said device to said host computer system;

(a0c) selecting a predetermined function, with said voice analysis software, for training and voice analysis of at least one word for invoking said predetermined function;

(a0d) capturing a plurality of voice inputs of said at least one word in said voice pickup component of said device;

(a0e) processing said plurality of voice inputs into a plurality of digital signals in said device;

(a0f) sending said plurality of digital signals from said device to said host computer system;

(a0g) analyzing said plurality of digital signals with said voice analysis software;

(a0h) developing said at least one recognition pattern from said analysis of said plurality of digital signals with said voice analysis software;

(a0i) storing said at least one recognition pattern in said function recognition table in said memory in said host computer system; and (a0j) transferring said at least one recognition pattern in said function recognition table in said memory in said host computer system for storage in said function recognition table in said static memory in said device, wherein said command number is associated with said at least one recognition pattern.

15. The voice command annotation method for a device according to claim 14 further comprising the steps of:

(a0k) repeating steps (a0c) through (a0j) for a plurality of predetermined functions, wherein a plurality of recognition patterns are developed from a plurality of said plurality of voice inputs for a plurality of said at least one words, and further wherein said plurality of recognition patterns are stored in said function recognition table in said static memory in said device, wherein each of said plurality of recognition patterns are associated with one of a plurality of command numbers stored in said function recognition table in said static memory.

16. The voice command annotation method for a device according to claim 14 wherein step (a0a) is replaced by the new step (a0a), steps (a0b), (a0f), and (a0i) are eliminated, and step (a0j) is replaced by the new step (a0j):

(a0a) accessing voice analysis software in said static memory in said device; and (a0j) storing said at least one recognition pattern in said function recognition table in said static memory in said device, wherein said at least one recognition pattern is associated with said command number stored in said function recognition table in said static memory.

17. The voice command annotation method for a device according to claim 16 further comprising the steps of:

(a0k) repeating steps (a0c) through (a0j) for a plurality of predetermined functions, wherein a plurality of recognition patterns are developed from a plurality of said plurality of voice inputs for a plurality of said at least one words, and further wherein said plurality of recognition patterns are stored in said function recognition table in said static memory in said device, wherein each of said plurality of recognition patterns are associated with one of a plurality of command numbers stored in said function recognition table in said static memory.

18. A device with voice command annotation comprising:

a voice pickup component for capturing a voice disposition command, and for outputting said voice disposition command as an analog signal;

an analog-to-digital converter, connected to said voice pickup component, for converting said analog signal into a digital signal;

a controller, connected to said analog-to-digital converter, for receiving said digital signal from said analog-to-digital converter and storing said digital signal in a voice command annotation file; and a host connection, connected to said controller, for establishing a connection with a host computer system, wherein said host computer system comprises a memory, voice analysis software loaded into said memory, and file transfer software loaded into said memory, wherein said file transfer software processes said voice command annotation file by calling said voice analysis software to perform a plurality of frequency domain transforms on said digital signal in said voice command annotation file, generating a first recognition pattern, wherein said first recognition pattern is a spectral transform of said digital signal, and further wherein said file transfer software compares said first recognition pattern to at least one recognition pattern for said at least one function stored in a function recognition table in said memory, wherein when said first recognition pattern matches said at least one recognition pattern for said at least one function stored in said function recognition table, said file transfer software retrieves a command number associated with said at least one recognition pattern and accesses through said command number said at least one instruction, wherein said at least one instruction is linked to said command number, and further wherein said file transfer software executes said at least one instruction.

19. The device with voice command annotation according to claim 18 further comprising:

an annotation control button connected to said controller, wherein said device is enabled to capture said voice disposition command with said voice pickup component when button down input from said annotation control button is received by said controller, and until button up input from said annotation control button is received by said controller, said voice disposition command is captured by said voice pickup component between said button down input and said button up input, and is converted to said analog signal, and then converted to said digital signal by said analog-to-digital converter, and stored as said voice annotation file in said static memory in said device, and associated with said data file stored in said static memory.

20. The device with voice command annotation according to claim 18 wherein said controller associates said voice command annotation file to said data file by giving said data file and said voice command annotation file a same file name, and giving said data file a first file extension name, and giving said voice command annotation file a second file extension name.

21. The device with voice command annotation according to claim 18 wherein said device is a portable scanner device.

22. The device with voice command annotation according to claim 18 wherein said device is a digital camera.

23. A device with voice command annotation comprising:

a voice pickup component for capturing a voice disposition command;

a controller, connected to said voice pickup component, for deriving a first recognition pattern from said voice disposition command; and a static memory, connected to said controller, for storing at least one recognition pattern in a function recognition table, and for storing a command number in said function recognition table associated with said at least one recognition pattern;

wherein, said controller compares said first recognition pattern with said at least one recognition pattern in said function recognition table stored in said static memory, and further wherein, when said first recognition pattern and said at least one recognition pattern match, said controller retrieves said command number from said function recognition table and stores said command number in a voice command annotation file in said static memory.

24. The device with voice command annotation according to claim 23 further comprising:

an analog-to-digital converter, connected to said voice pickup component;

wherein said voice disposition command is output to said analog-to-digital converter as an analog signal, and said analog-to-digital converter converts said analog signal into a digital signal, and further wherein said analog-to-digital converter outputs said digital signal to said controller, and said controller converts said digital signal into said first recognition pattern.

25. The device with voice command annotation according to claim 24 wherein said controller converts said digital signal into said first recognition pattern by performing a plurality of frequency domain transforms on said digital signal, generating said first recognition pattern, wherein said first recognition pattern is a spectral transform of said digital signal.

26. The device with voice command annotation according to claim 23 further comprising.

a host connection connected to said controller; and a host computer system having a communications interface, wherein said host connection of said device is connected to said communications interface of said host computer system, allowing communication to occur between said device and said host computer system;

wherein a plurality of voice inputs of at least one word to be used for invoking a predetermined function are captured by said voice pickup component, processed in said device into a plurality of digital signals, and said plurality of digital signals are transferred from said device to said host computer system, and further wherein said plurality of digital signals are analyzed, with voice analysis software loaded into a memory in said host computer system, generating a recognition pattern for said at least one word from said plurality of digital signals, wherein said recognition pattern is associated with said command number for said predetermined function, and further wherein said recognition pattern and said command number are transferred from said host computer system to said device and stored in said function recognition table in said static memory in said device.

27. The device with voice command annotation according to claim 23 wherein said device is a portable scanner device.

28. The device with voice command annotation according to claim 23 wherein said device is a digital camera.

* * * * *